Dec. 10, 1968     T. R. KARMANN     3,415,451
TRAVELING IRRIGATION SPRINKLER APPARATUS
Filed Aug. 1, 1966     3 Sheets-Sheet 1

INVENTOR
THOMAS R. KARMANN
BY
ATTORNEY

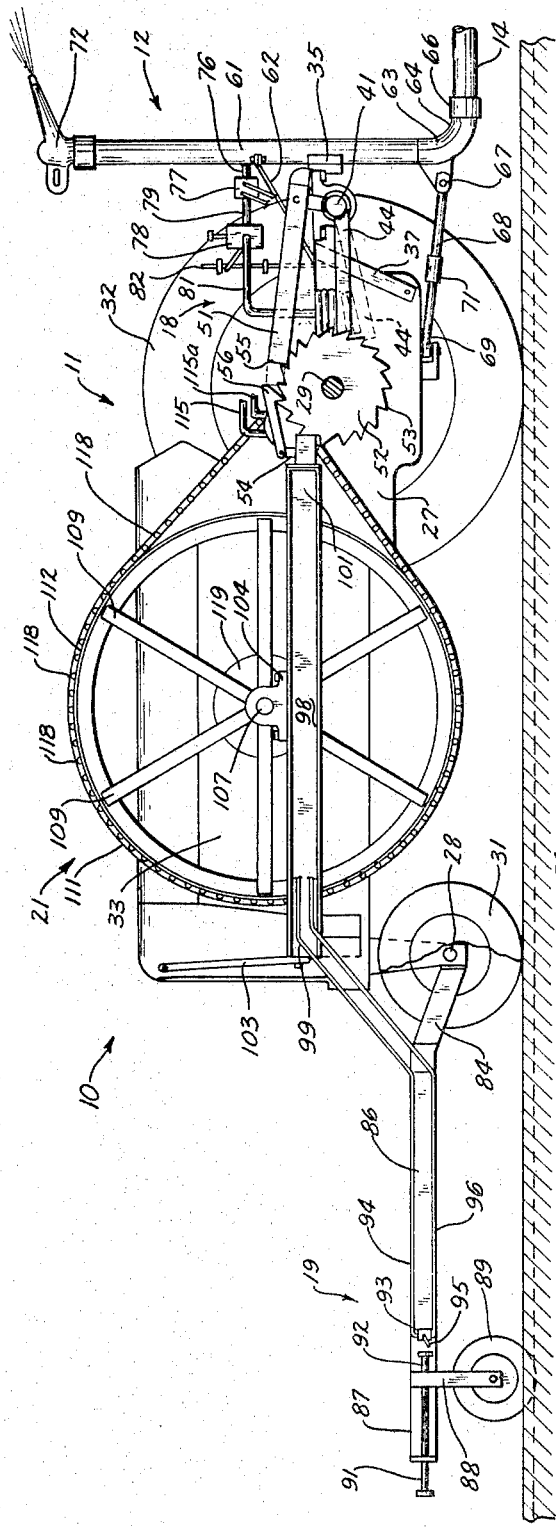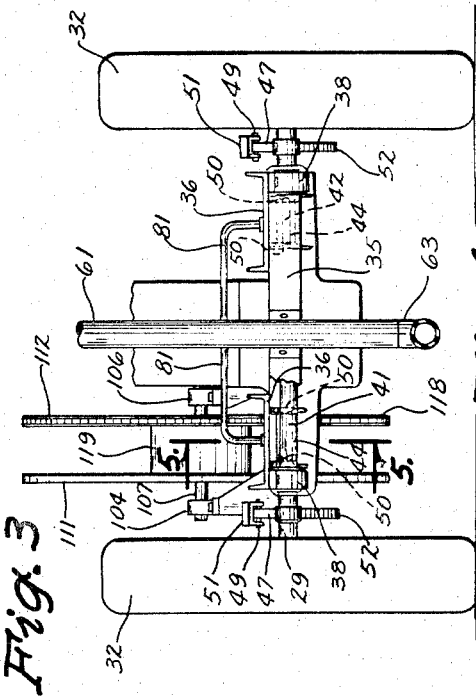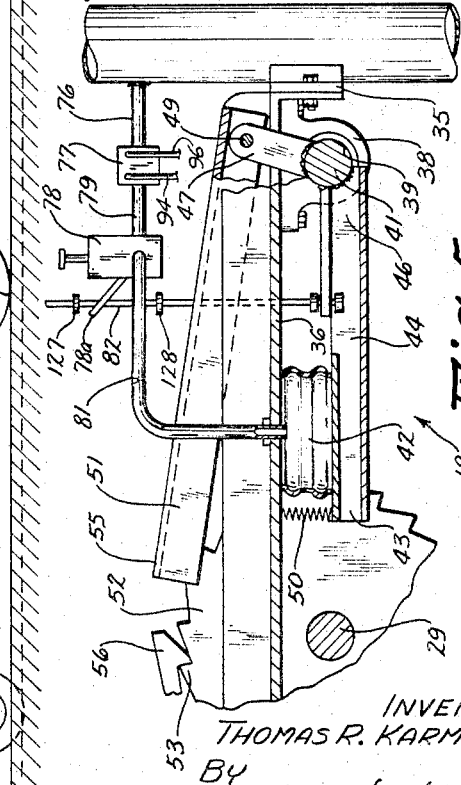

Dec. 10, 1968  T. R. KARMANN  3,415,451
TRAVELING IRRIGATION SPRINKLER APPARATUS
Filed Aug. 1, 1966  3 Sheets-Sheet 3
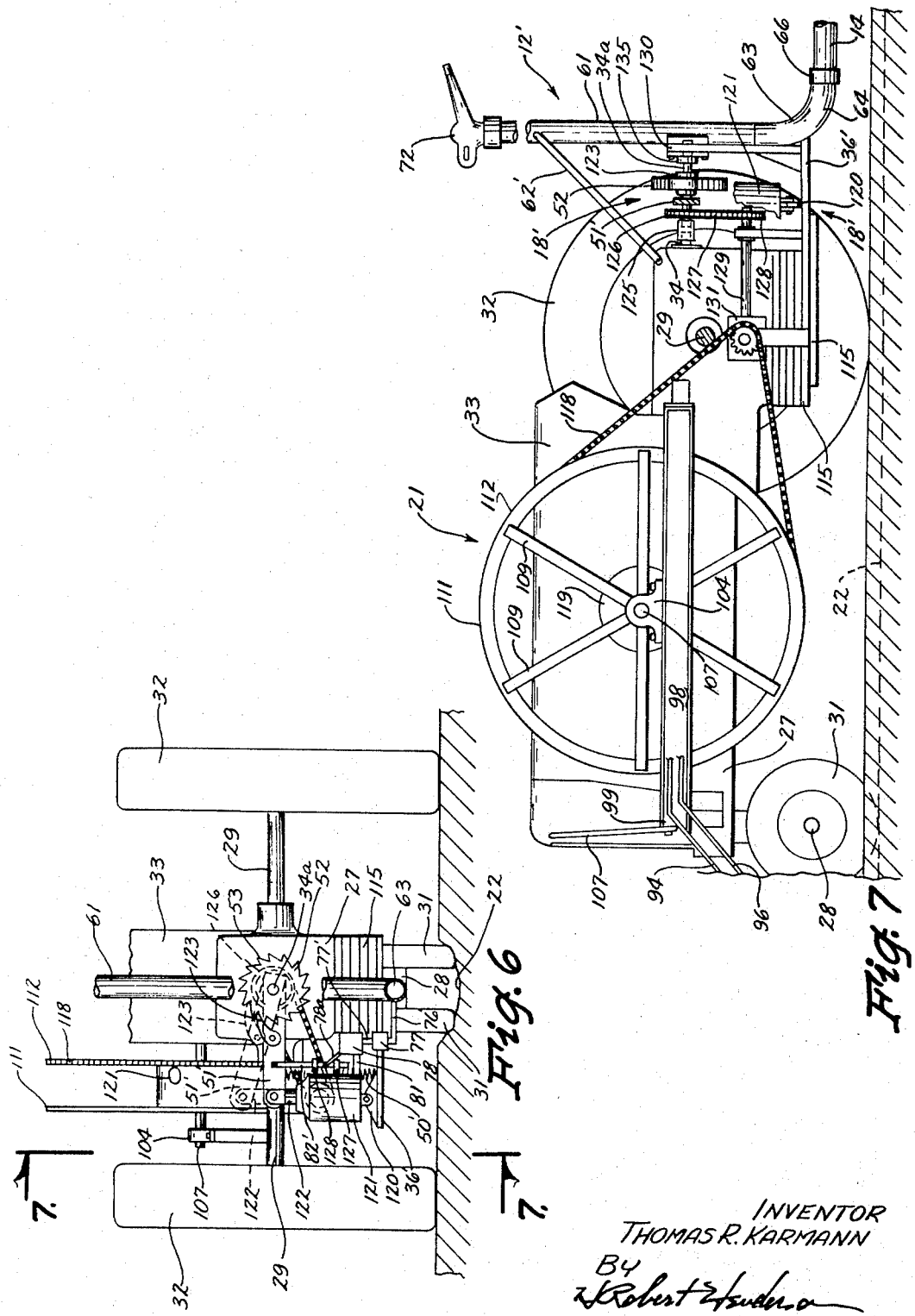
INVENTOR
THOMAS R. KARMANN
BY
ATTORNEY

United States Patent Office 3,415,451
Patented Dec. 10, 1968

3,415,451
TRAVELING IRRIGATION SPRINKLER
APPARATUS
Thomas R. Karmann, 6441 McKinley St.,
Omaha, Nebr. 68112
Filed Aug. 1, 1966, Ser. No. 569,159
17 Claims. (Cl. 239—191)

ABSTRACT OF THE DISCLOSURE

This invention relates to a self propelled traveling irrigation sprinkler apparatus having a frame supported on a pair of axles with wheels mounted thereon, a power unit mounted on the frame for propelling same, a transmission interconnecting the power unit and one of the axles, a steering mechanism mounted on the frame and operably connected to the other axle for turning same, sprinkler means carried by the frame and operable in response to the application thereto of water under pressure, a length of hose interconnected between the sprinkler unit and a source of water under pressure, a hydraulic mechanism fluidly connected to the hose and carried by the frame, the hydraulic mechanism operable to propel the frame in response to the application thereto of water under pressure, and a furrow follower connected to the steering axle for guiding the frame along a preformed furrow.

---

In recent years, more and more emphasis has been placed on the successful development of sprinkling apparatus for particular use in the irrigation of agricultural fields. Replacing the conventional fixed sprinkler arrangement of a plurality of pipe sections coupled together have been several moderately successful portable apparatus.

For example, there have been machines developed which are adapted to follow an irrigation ditch provided in the field, the machine being adapted to draw water from the irrigation ditch during its movement therealong and spray the same over the field with conventional sprinkler heads. A machine of this type, of course, eliminates the necessity of providing an elongated pipe section system. However, because the source of water to the machine is not under pressure, such machines are limited to those areas where flow of water through the irrigation ditches can be accomplished by gravity. Consequently, such machines are not suitable to hilly conditions. Moreover, where permanent irrigation ditches are provided in the field, crops can not be grown in the same area.

Still another machine which has received some acceptance embodies in essence an elongated sprinkler pipe section system which is articulated between sections and mounted on wheels for movement in a circular path in a field. The machine is guided in its path of movement about a fixed source of water in the field which is swivelly connected to one end of the pipe system, the latter moving about the source as a center. The circular path of movement of the machine limits the spray pattern to a circular one so that in conventional rectangular fields the corner portions of the field are not adequately irrigated, if at all.

And yet another is the provision of an irrigation sprinkler which is self-movable in a field so as to eliminate the requirement for an attendant during its operation, which utilizes a flexible conduit to convey a source of water under pressure from a fixed position to the movable spraying heads during operation, so as to eliminate the necessity of handling elongated rigid pipe sections and which is capable of a self-propelled movement in a field through a variable path so as to provide a spray pattern which can accomodate various conditions encountered both as to the shape of the field in plan, as well as the shape of the field vertically, that is, whether it is flat or hilly.

During this onrush of improvements in the field of traveling sprinklers, the capability of the sprinkler being propelled during sprinkling without an attendant present, and self-propelled when not sprinkling has been overlooked. Thus, a most cumbersome and complicated structure has resulted which, while providing a successful self-propelling thereof during the sprinkling and guide furrow forming process, lacks all the advantages attendant with a prime mover.

It is, therefore, an object of this invention to provide a traveling irrigation sprinkler which is self-propelled in a field so as to obviate the need for an attendant, and the rate of movement of which is in keeping with that rate most suitable for effective sprinkling, and which sprinkler utilizes the water for both propelling itself and irrigation purposes, but wherein the sprinkler is capable, when not connected to the source of water under pressure, of guided self-movement without the need of auxiliary equipment, such as a prime mover.

Another object of this invention is the provision of a traveling irrigation sprinkler as featured hereinbefore, which is capable of being operator driven so as to be self-moved from one furrow to another, from one field to another, to be backed and to be self extricated, to have a highly desirable sharp turning radius, and importantly, to be useable as a prime mover.

Yet another object of this invention is the provision of a traveling, self-propelled irrigation sprinkler capable of achieving extensive water coverage, irrigating an area of a field having a length approximately twice the effective length of a water hose carried thereby.

Still another object of this invention is the provision of a sprinkler as set forth herein which embodies a novel system of propelling the wheeled frame of the sprinkler, and wherein the water used by the sprinkler to irrigate is also used to operate the propelling system for moving the sprinkler.

A further object of this invention is the provision of an irrigation sprinkling apparatus capable of attaining the above objectives which can be mounted on or dismounted from a conventional farm tractor without special skills or special tools.

A still further object of this invention is the provision of an irrigation sprinkling apparatus adapted to be mounted on a conventional tractor thus providing a compact unit that is extremely easy to operate and which requires a minimum area for turning, thus providing for the maximum irrigation of a field with a minimum of time and effort.

Yet another object of this invention is to provide an irrigation sprinkling apparatus mounted on a tractor, and which has a water actuated mechanism for propelling the tractor while the apparatus is irrigating a field.

A still further object of this invention is the provision of an irrigation sprinkling apparatus which is relatively simple in construction, economical to manufacture, and sturdy in construction.

Still another object of this invention is to provide an irrigation sprinkling apparatus which incorporates an automatic steering assembly for following a preformed furrow or a predetermined path, which obviates the requirement that the apparatus be under the control of an operator during the irrigation process.

Yet a further object of this invention is the provision of an irrigation sprinkling apparatus which is mounted on a conventional tractor for propelling the tractor during the sprinkling process, and which incorporates a stop device for stopping the tractor at the completion of the irrigation cycle.

Another object of this invention is the provision of an irrigation sprinkling apparatus mounted on a conventional farm tractor, wherein the power of the tractor is utilized for propelling the tractor to and from the field to be irrigated, to move the tractor from one predetermined path to another predetermined path, and to roll the hose on the reel when it is necessary to transport the hose from one location to another, as compared to dragging the hose.

These objects, and other features and advantages of this invention will become more readily apparent upon reference to the following description, when taken in conjunction with the accompanying drawings, wherein:

FIG. 3 is a cross sectional view taken along line 3—3 in FIG. 2, and showing the majority of the apparatus in side elevation;

FIG. 4 is a rear elevational view of the apparatus;

FIG. 5 is a greatly enlarged fragmentary sectional view taken along the line 5—5 in FIG. 4;

FIG. 6 is a rear plan view of a tractor with a modified embodiment of the invention attached thereto;

FIG. 7 is a fragmentary, cross sectional view taken along the line 7—7 in FIG. 6, and showing the majority of the apparatus in side elevation.

Figure 1:
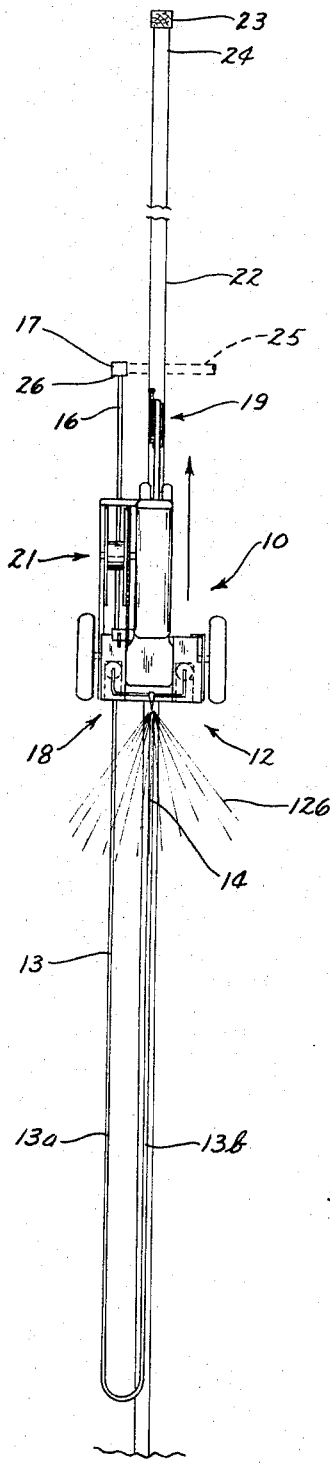
FIG. 1 is a top plan view of a tractor with the irrigation sprinkling apparatus of this invention attached thereto, as it would appear while operating in a field.

Referring now to the drawings, the irrigation sprinkler apparatus of this invention is indicated generally at 10 in FIG. 3; and includes a conventional tractor 11; a sprinkler unit 12 detachably mounted on the rear of the tractor 11; a length of hose 13 (FIG. 1), one end 14 (FIG. 3) of which is adapted to be connected to the sprinkler unit 12 and the other end 16 (FIG. 1) of which is adapted to be connected to a source of water 17 under pressure; a hydraulic device 18 operably connected to the tractor and fluidly connected to the hose wherein it is operable in response to the application thereto of water under pressure for the propulsion of the tractor; a follower unit 19 attached to the tractor for guiding the same; and a reel unit 21 rotatably mounted on the tractor and adapted ot carry the hose 13.

The apparatus 10 is depicted in FIG. 1 under operating conditions in a field having a furrow 22 preformed therein by means conventionally used for such purpose, the furrow 22 used to guide the tractor 11 via the follower unit 19 described hereinafter. A stop device 23 for automatically limiting the travel of the tractor 11, as described more in detail hereinafter, is disposed at one end 24 of the furrow 22, and a valve 26, fluidly connected to an underground system 25 of water under pressure, is disposed adjacent the furrow 22 at the approximate longitudinal center thereof. The hose 13 is placed with part 13a of the hose 13 adjacent to and in parallel relation to the furrow 22 and with the other part 13b thereof disposed in the furrow 22.

Figure 2:
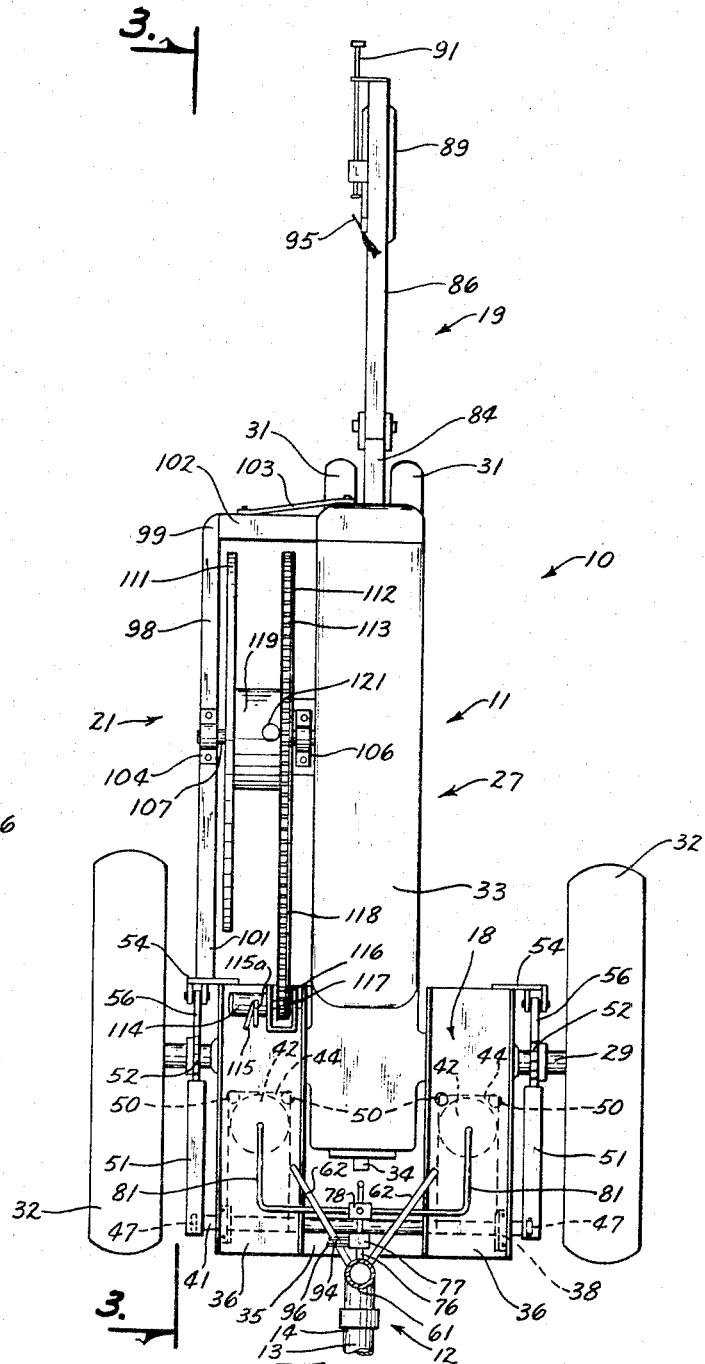
FIG. 2 is an enlarged top plan view of the apparatus.

More specifically, the tractor (FIG. 3) includes a frame 27, a front axle 28 and a rear axle 29 mounted on the frame 27, a pair of front wheels 31 rotatably mounted on the front axle 28, a pair of rear wheels 32 mounted on the rear axle 29, a motor 33 operably connected through a transmission (not shown) to the rear axle 29, and a power take-off 34 (FIG. 2) operatively connected to the motor 33 through the transmission.

The hydraulic device 18 (FIG. 2) includes a pair of transversely spaced, horizontally disposed channel plates 36 (see FIG. 4) detachably secured to the frame 27 and disposed over the rear axle 29, wherein one of the plates 36 is positioned adjacent each rear wheel 32. Depending braces 37 (FIG. 3) are secured at an upper end thereof to each of the plates 36 and at the lower end thereof to the frame 27, below the rear axle 29, to rigidly support the plates 36. An elongated cross member 35 (FIG. 4), disposed rearwardly and in parallel relation to the rear axle 29, rigidly interconnects the rear end of the plates 36. A pair of bearing mounts 38 (FIGS. 2 and 5) are secured one to each underside of each of the plates 36 at the rear edge thereof. The mounts 38 are transversely aligned and rotatably receive an elongated shaft 41 extended through and laterally beyond the mounts 38.

Mounted on the underside of each of the plates 36 (FIG. 5) and depending therefrom is an expandable bellows-type, actuator 42, which is fluidly connected at the top thereof to the sprinkler unit 12 as described hereinafter. One end 43 of an elongated rocker bar 44 is fastened to the bottom of each of the actuators 42 and the other end 46 thereof is secured, as by welding, to the shaft 41. A pair of transversely spaced links 47 (FIG. 5) are secured, as by welding, at a lower end to the shaft 41, with the upper end pivotally connected at 49 to a power arm 51 which extends over the plate 36 and toward the rear axle 29, as depicted in FIG. 5. A pair of springs 50 are mounted between each of the plates 36 and its corresponding rocker bar 44 and adjacent each of the actuators 42 for biasing the actuators to a non-expanded position, as shown in FIG. 5.

A pair of transversely spaced ratchet wheels 52 are operably connected to the rear axle 29, by mounting thereto, with one ratchet wheel 52 disposed adjacent each rear wheel 32. A plurality of arcuately spaced teeth 53 are formed on the periphery of each of the ratchet wheels 52, and are drivingly engaged by the forward end 55 of each of the power arms 51. A pair of brackets 54 (FIG. 2) are secured on the forward ends of the plates 36, each in alignment with a ratchet wheel 52. Pivotally mounted on each of the brackest 54 is a wheel stop 56 which engages the teeth 53 for preventing the rearward rotation of the ratchet wheel 52.

The sprinkler unit 12 (FIG. 3) includes an upstanding, elongated pipe 61 which is attached, as by bolts, to the member 35 intermediate the plates 36. A pair of struts 62 are secured on one end thereof to the pipe 61 above the member 35, and on the other end thereof to the plates 36, as best observed in FIG. 2, for supporting the pipe 61 in an upright position. Fluidly connected to the lower end of the pipe 61 (FIG. 3) is an elbow 63 having one end 64 thereof projecting rearwardly of the tractor 11. A quick hose disconnect 66 is secured to the end 64, to receive the fluid hose end 14. Attached to the outer surface of the elbow 63 is one end 67 of a puller brace unit 68, with the other end 69 thereof secured to the frame 27. A turnbuckle 71 is rotatably attached to the unit 68 to adjust the length of the brace unit 68 for maintaining the pipe 61 in an upright position, and to transfer the weight of the trailing hose 13 from the pipe 61 to the frame 27. Rotatably mounted on the upper end of the pipe 61 is a sprinkler gun 72. The gun 72 is a step-by-step rotary type actuated by a oscillating impulse arm (not shown) in conventional fashion.

A conduit 76 (FIG. 2) fluidly interconnects a pilot valve 77 to the pipe 61. Fluidly connecting the pilot valve 77 to a poppet valve 78 is a second conduit 79 (FIG. 3). A pair of third conduits 81 are fluidly attached to the poppet valve 78 with each fluidly interconnecting one of the actuators 42 thereto. The poppet valve 78 is operably connected to the shaft 41 by a mechanical linkage 82, the operation thereof to be described hereinafter.

A furrow follower assembly 19 (FIGS. 2 and 3) is detachably mounted to the front axle 28, and includes a bar 84 detachably mounted to the front axle 28 and extending forward therefrom. An elongated beam 86 is pivotally mounted to the bar 84, wherein only vertical movement between the bar 84 and beam 86 is possible while horizontal displacement therebetween is prohibited. Rigidly attached near the outer end 87 of the beam 86 is a depending wheel support 88, to which a wheel 89 is rotatably mounted for supporting the follower assembly 19.

An elongated rod 91, slideably mounted on the outer end 87, is longitudinally disposed along the beam 86 and extends outwardly therefrom. The inner end 92 of the rod 91 is spaced, in a first position, from a stop valve 93, which is mounted on the beam 86. The valve 93 has an on-off handle 95 attached thereto. A pair of parallel tubes 94 and 96 (FIG. 3) are fluidly connected, one to the input and one to the output of the stop valve 93. The tubes 94 and 96 fluidly connect the stop valve 93 to the pilot valve 77 (FIG. 5), for a purpose hereinafter described.

A reel unit 21 (FIG. 2) is spaced from and disposed parallel to the motor 33. A horizontally disposed support beam 98 is connected, at the forward end 99 by a member 102, to the front of the frame 27, and at the rear end 101 to the frame 27 at the rear axle 29. The member 102 is also supported by a brace 103 attached to the top front of the frame 27.

Axle bearing mounts 104 and 106 (FIG. 2) are disposed intermediate the longitudinal axis of the motor 33, with one of the mounts 104 mounted on the beam 98 and with the other mount 106 mounted on the frame 27, wherein the mounts 104 and 106 are transversely, axially aligned. A reel axle 107 is rotatably mounted in and extends between the brackets 104 and 106, and supports a hub (not shown) having a plurality of arcuately spaced spokes 109 (FIG. 3) extending radially therefrom which are secured on both sides of the hub, thus forming a pair of spaced parallel flanges. The outer ends of the spokes 109, on each side of the hub, culminate at a ring 111 and 112 which is welded thereto. The ring 112 adjacent the motor has a plurality of chain engaging teeth 113 formed on the periphery thereof.

Mounted on the frame 27 and above the plate 36 is a hydraulic motor 114 (FIG. 2) which is fluidly connected by conduits 115 and 115a to the hydraulic systems (not shown) of the tractor 11. The hydraulic motor 114 powers a sprocket wheel 116 having chain engaging teeth 117 formed thereon. The ring 112 and the wheel 116 are interconnected by a chain 118, and upon energization of the hydraulic motor 114 the hub is caused to rotate. A second hub 119, spaced radially from the hub and disposed between the spokes 109, is provided for winding the hose 13 thereabout. An opening 121 (FIG. 2) is formed in the second hub for the purpose of inserting end 14 of the hose 13 for facilitating the winding of the hose 13 about the second hub 119.

For the proper operation of the apparatus 10, the field to be irrigated must be prepared for optimum operation. A pipe 25 (FIG. 1) should be laid under the surface the length of the field and fluidly connected to a source of water under pressure. A plurality of furrows 22 should be formed laterally of the pipe with adjacent furrows preferably spaced from each other a distance equal to twice the distance that the sprinkling gun can effectively cover. Adjacent each furrow as it crosses the pipe 25 is the valve 26 which is fluidly connected to the pipe, the location to be such so as not to obstruct the travel of the tractor 11. At one end 24 of the furrow 22 the stop device 23, such as a stake, is driven into the ground in an upstanding position, wherein the rod 91 can come into contact therewith.

In operation, the apparatus 10 is mounted, with the furrow follower assembly 69 pivoted to a position wherein the beam 86 (FIG. 2) is swung upwardly in an upstanding position against the front end of the frame 27, and the tractor 11, under its own power, is driven to the field to be irrigated. The tractor 11 (FIG. 1) is preferably driven to the longitudinal center of the field, immediately adjacent to or over one of the valves 26. The valve 26 has a quick hose disconnect (not shown) mounted thereon, to which one end 16 of the hose 13 is connected. The tractor 11 is then driven to the end of the furrow opposite the stop device 23 with the hose 13 unreeling along the side of the furrow 22. At that end, the tractor is positioned with the furrow follower beam 86 horizontally disposed, the wheel 89 disposed in the furrow, and the tractor facing the stop device 23 located at the opposite end 24 of the furrow 22. The other end 14 of the hose 13 is connected to the quick hose disconnect 66 located on the sprinkler unit 12.

The valve 26 (FIG. 1) is opened and water under pressure flows through the hose 13 to the sprinkler pipe 61 located on the tractor 11. The water flows through the pipe 61 (FIG. 3) and to the gun 72 from which its emission causes the gun 72 to rotate about a 360° circle by the water pressure, thus sprinkling a considerable circular area of the field with water 126 as best noted in FIG. 1.

The water simultaneously flows into and through the conduits 76, 79, and the two conduits 81 (FIG. 5), via the pilot valve 77 and the poppet valve 78 into the actuators 42. The water pressure causes the actuators 42 to expand thus effectuating a downward pivotal movement of the bars 44 as best noted in dotted lines in FIG. 3. This movement of the bars 44 causes a counterclockwise rotation of the shaft 41, as viewed in FIG. 5, which in turn effectuates a forward movement of the power arms 51 by the transfer of the rotational force through the linkage 47. The movement of the power arms 51, in engagement with a tooth 53 of each ratchet wheel 52 effectuates a partial rotation of the wheel 52 and the axle 29, thus causing the tractor to be propelled in a forward direction. The wheel stop 56 pivots upwardly, allowing the ratchet wheel to rotate and then engages a tooth thereof to prevent counter rotation thus effectively preventing a rearward movement of the tractor.

Also, upon rotation of the shaft 41 (FIG. 5) the mechanical linkage 82 is lowered, whereby a trip stop 127 engages an arm 78a of the valve 78, closing the valve 78 to the flow of water therethrough. When the complete expansion of the actuators 42 are accomplished, the water therein is allowed to escape therefrom through a pressure release valve (not shown). The actuators 42 then contract to their original positions, shown in full line in FIG. 5, by the action of the biasing springs 50, with an accompanying return movement of the arms and linkages associated therewith. The poppet valve 78 is opened by the trip valve 128 and the cycle recommences.

It is obvious that the forward movement of the tractor is barely perceptible, thus allowing for adequate irrigation of the field. The tractor pulls the hose 13 along and continues until it reaches the end 24 of the furrow 22. At the location, the rod 91 (FIG. 3) of the furrow follower unit 19 engages the stop device 23 and is forced to slide rearwardly along the beam 86, whereupon it engages the stop valve handle 95 and causes the stop valve 93 to close. The closing of the valve 93 prevents the flow of water therethrough thus closing the pilot valve 77 and stopping the flow of water to the actuators 42 and the forward movement of the tractor 11 is halted; however, the sprinkler unit 12 continues to irrigate the surrounding field.

Upon completion of the irrigation, as described hereinabove, the valve 26 is manually closed and the hose 13 is disconnected from the sprinkler unit 12 and the valve 26. End 14 of the hose 13 is placed in the opening 121 of the hub 119 and the hydraulic motor 114, operably connected to the hydraulic system of the tractor, is energized thus winding the hose 13 onto the hub 119. The tractor is driven to the next furrow and to the valve 26 located therein, and the above cycle as described hereinabove is repeated.

It is obvious that the sensitivity of the rod 91 (FIG. 3) can be adjusted, wherein if the tractor 11 should stray from the prescribed path, the rod upon contacting any foreign object, for example growing corn, would retract thus effectuating a stoppage of the hydraulic device 18. It is also possible to fluidly connect the pilot valve 77 to the pipe 61, whereby upon contact of the rod 91 with the stop device 23 or some other foreign object, the water would be shut off thus stopping the forward motion of the tractor and the flow of water to the sprinkler gun 72.

At the completion of the irrigation process, the sprinkler unit 12, the hydraulic device 18, the follower unit 19 and the reel unit 21 can be readily removed from the tractor 11, thus releasing the tractor 11 for other duties.

A modified embodiment of the irrigation sprinkler apparatus 10' is illustrated in FIGS. 6 and 7. As most of the parts thereof are identical to the apparatus described hereinbefore, like reference numerals are used to identify like parts.

The power take-off 34, on a conventional tractor, is operably connected to the motor 33 through the transmission. It is also possible to transmit power in reverse relation by applying an external rotational force to the power take-off and causing the transmission to operate which in turn, because it is connected to the rear axle, will transmit the force to the rear axle. Among other things, the function of the modified embodiment is to accomplish this transfer of power thus propelling the tractor during the irrigation cycle.

The depending and rearward portion of the frame 27 has a plurality of members 115 detachably attached thereto, as best noted in FIGS. 6 and 7. A hydraulic device 18' includes a plate 36' rigidly mounted between the members 115 (FIG. 6), and disposed rearwardly of the rear axle 29. An upstanding hollow cylinder 121 is mounted on the plate 36' by a mounting block 120. Reciprocally mounted within the cylinder 121 and responsive to water under pressure is a piston (not shown) to which is attached a piston rod 122 having a free end extended outwardly from the cylinder 121.

A power arm 51' (FIG. 6) is pivotally mounted on one end thereof to the free end of the rod 122 and pivotally mounted on the other end thereof to a shaft 34a axially aligned and connected to the power take-off 34 by a quick disconnect 125. Intermediate the ends of the power arm 51' a pawl 123 is pivotally mounted. A spring 50' is attached between the power arm 51 and the plate 36' for biasing the rod 122 in a position as shown in full line in FIG. 6.

A ratchet wheel 52 is mounted on the shaft 34a and secured thereto by dogs (not shown) and the pawl 123 is drivingly engageable with the teeth 53 thereof. A wheel stop (not shown) is employed to prevent counter rotation of the ratchet wheel 52.

A sprinkler unit 12' (FIG. 7) includes an upstanding elongated pipe 61 which is attached, at the lower end thereof, to the plate 36. A pair of struts 62' are attached at the upper end of the pipe 61, as by welding, and to the frame 27 by bolts, for rigidly supporting the pipe 61. An upstanding element 130 is secured to the plate 36 adjacent the pipe 61 at the lower end thereof and to the pipe 61 intermediate the ends thereof. At the upper end of the element 130 a bearing mount 135 is attached for supporting the outer end of the shaft 34a.

Fluidly connected to the lower end of the pipe 61 is an elbow 63 having the free end 64 thereof projecting rearwardly of the tractor 11. A quick hose disconnect 66 is secured to the free end 64 to receive the fluid hose end 14. Rotatably mounted on the upper end of the pipe 61 is a sprinkler gun 72 as described hereinbefore.

A conduit 76' (FIG. 6) fluidly interconnects a pilot valve 77 to the pipe 61. Fluidly connecting the pilot valve 77 to a poppet valve 78 is a second conduit 79'. A third conduit 81' is fluidly attached to the poppet valve 78 and fluidly interconnects the cylinder 121 thereto. The poppet valve 78 is operably connected to the power arm 51' by a mechanical linkage 82', the operation thereof to be described hereinafter.

The furrow follower assembly 19 (FIGS. 2 and 3) is detachably connected to the front axle 28 and extends forwardly therefrom as described hereinbefore.

A reel unit 21, as described hereinabove, is detachably mounted to the frame 27. A ratchet tooth gear 126 (FIG. 6) is rotatably mounted on the shaft 34a adjacent the arm 51', and is connected by a chain 127 to a second gear 128 for rotating a shaft 129. The shaft 129 is connected to a gear box 131 which in turn is chain-connected by a chain 118 to the ring 112 of the reel unit 21.

In operation the apparatus 10' is mounted on the tractor and the tractor is driven to the field, wherein the various operations as the connecting of the hose, the positioning of the hose, the furrow follower assembly and the tractor are completed, as described hereinbefore.

The valve 26 (FIG. 1) is opened and water under pressure flows through the hose 13 to the sprinkler pipe 61 located on the tractor 11. The water flows through the pipe 61 (FIG. 3) and to the gun 72 from which its emission causes the gun 72 to rotate about a 360° circle by the water pressure, thus sprinkling a considerable circular area of the field with water 126 as best noted in FIG. 1.

The water simultaneously flows into and through the conduits 76', 79' and 81' (FIG. 7), via the pilot valve 77 and the poppet valve 78 into the cylinder 121. The piston in response to the water under pressure, is actuated and the rod 122 moves upwardly. The power arm 51' pivots from a first position, shown in full line in FIG. 6, to a second position, shown in dotted line, and the pawl 123 pivots and moves upwardly and toward the ratchet wheel 52. The movement of the pawl 123, in engagement with a tooth 53 of the ratchet wheel effects a partial rotation of the wheel 52, thus causing the tractor to be propelled in a forward direction.

Also, upon movement of the power arm 51' (FIG. 7), the mechanical linkage 82' is raised whereby a trip stop 127 engages an arm 78a of the valve 78 closing the valve 78 to the flow of water therethrough. Simultaneously, the water in the cylinder is allowed to escape through a pressure release valve (not shown). The rod 122 moves downwardly to its original position, shown in full line in FIG. 6, by the action of the biasing spring 50, with an accompanying return movement of the arm 51' and linkages associated therewith. The poppet valve 78 is opened by a trip stop 128 and the cycle recommences.

It is obvious that the forward movement of the tractor is barely perceptible, thus allowing for adequate irrigation of the field. The tractor pulls the hose 13 along and continues until it reaches the end 24 of the furrow 22. At this location, the rod 91 (FIG. 3) of the furrow follower assembly 19 engages the stop device 23 and is forced to slide rearwardly along the beam 86, whereupon it engages the stop valve handle 95 and causes the stop valve 93 to close. The closing of the valve 93 prevents the flow of water therethrough, which closes the pilot valve 77, thus stopping the flow of water to the cylinder 121, and the forward movement of the tractor 11 is halted; however, the sprinkler unit 12' continues to irrigate the surrounding field.

Upon completion of the irrigation, as described hereinabove, the valve 26 is manually closed and the hose 13 (FIG. 7) is disconnected from the sprinkler unit 12' and the valve 26. The dogs securing the ratchet wheel 52 to the shaft 34a are removed thus allowing the shaft 34a to rotate without a corresponding rotation of the wheel 52. End 14 of the hose 13 is placed in the opening 121 of the hub 119 and the hose is wound onto the hub 119 by operating the motor 33 which transmits power through the power take-off to the gear 126. It will be noted that during the complete irrigation process the gear 126 is connected to the shaft 34a, therefore the reel unit 21' will continuously rotate.

The sprinkler apparatus 10 is easily removed from the tractor by releasing the quick disconnect 125 from the power take-off 34 and removing the sprinkler unit 12' the hydraulic unit 18', the follower assembly 19 and the reel unit 21', thus releasing the tractor for other service.

Although a preferred embodiment and one modified embodiment of this invention has been described and disclosed hereinbefore, it is to be remembered that various modifications and alternate constructions can be made thereto without departing from the true spirit and scope of the invention as defined in the appended claims.

I claim:
1. A traveling irrigation sprinkler apparatus comprising:
axle means;
wheel means mounted on said axle means;
frame means mounted on said axle means;
steering means operably connected to said axle means for manually guiding said frame means;
power means mounted on said frame means and operably connected to said axle means for rotating same;
sprinkler means detachably carried by said frame means and operable in response to the application thereto of water under pressure;
a length of hose, one end of which is adapted to be connected to said sprinkler means and the other end of which is adapted to be connected to a source of water under pressure;
hydraulic means detachably mounted on said frame means and fluidly connected to said hose, said hydraulic means operable in response to the application thereto of water under pressure, said hydraulic means operably connected to said axle means for rotating said axle means;
valve means fluidly interposed between said hose and said hydraulic means, and operable in response to the flow of water under pressure therethrough to control the flow of water to said hydraulic means; and
guide means detachably mounted on said axle means and operable to guide said frame means.

2. A traveling irrigation sprinkler apparatus as defined in claim 1, and further wherein said hydraulic means includes actuator means mounted on said frame means and operable in response to the application thereto of water under pressure, ratchet wheel means operably connected to said axle means for rotating same, and rotatable power arm means journaled on said actuator means and interconnected between said actuator means and said ratchet wheel means for rotating said ratchet wheel means in response to operation of said actuator means.

3. A traveling irrigation sprinkler apparatus as defined in claim 2, and including further valve operating means fastened to and responsive to operation of said power arm means, and operably connected to said valve means, said valve operating means operable in a first position to open said valve means to allow water to flow therethrough to said actuator means, and operable in a second position to close said valve means thus shutting off the flow of the water to said actuator means.

4. A traveling irrigation sprinkler apparatus as defined in claim 3, and further wherein said axle means includes a rear axle; and said power means includes a motor mounted on said frame means, a transmission connected to said motor and operable in response thereto for rotating said rear axle, and a power take-off connected to said transmission; said ratchet wheel means being detachably mounted on said power take-off and operable to rotate said power take-off and thus said rear axle, in response to operation of said actuator means.

5. A travelling irrigation sprinkler apparatus as defined in claim 4, and further wherein said actuator means includes a plate detachably mounted on said frame means, an actuator mounted on said plate and fluidly connected to said valve means, said actuator expendible in response to the application thereto of water under pressure; said power arm means includes a pivotally mounted power arm connected at a free end thereof to said actuator, a pawl pivotally mounted on said power arm and operably engageable with said ratchet wheel means, wherein upon expansion of said actuator said power arm pivots causing said pawl to effectuate a partial rotation of said ratchet wheel means.

6. A traveling irrigation sprinkler apparatus as defined in claim 5, and further wherein said actuator means includes a cylinder mounted on said plate and fluidly connected to said valve means, a piston reciprocally mounted in said cylinder and responsive to water under pressure, a piston rod having one end thereof secured to said piston and having the other end thereof extended outwardly from said piston wherein it is pivotally mounted on said one end of said power arm, said piston and piston rod operable to pivot said power arm in response to the flow of the water into and out of said cylinder.

7. A traveling irrigation sprinkler apparatus as defined in claim 6, and including further furrow follower means detachably mounted on and extending forwardly of said front axle and operable to guide said frame means, said follower means having a stop valve means mounted thereon and fluidly connected to said valve means, said stop valve means operable in response to engagement with a foreign object for shutting off the flow of water to said valve means.

8. A traveling irrigation sprinkler apparatus as defined in claim 7, and including further reel means rotatably mounted on said frame means and operable in response to said motor for winding said hose thereon.

9. A traveling irrigation sprinkler apparatus as defined in claim 8, and further wherein said reel means includes a reel rotatably mounted on said frame means and chain-connected to said power take-off, said reel being caused to rotate upon rotation of said power take-off in response to operation of said motor, said reel having a hose holding device to which one end of said hose is connected to effect a winding of said hose about said reel.

10. A traveling irrigation sprinkler apparatus as defined in claim 3, and further wherein said axle means includes a rear axle, with said ratchet wheel means mounted on said rear axle.

11. A traveling irrigation sprinkler apparatus as defined in claim 10, and further wherein said actuator means includes a plate detachably mounted on said frame means, an actuator mounted on said plate and fluidly connected to said valve means, said actuator expendible in response to the application thereto of water under pressure; said power arm means includes a shaft rotatably mounted on said plate, an elongated bar interconnected between said actuator and said shaft, a link secured to said shaft and having a free end, and a power arm pivotally connected to said free end and drivingly engaged with said ratchet wheel means, said shaft rotatable in response to expansion of said actuator thus causing said power arm to effect a partial rotation of said ratchet wheel means.

12. A traveling irrigation sprinkler apparatus as defined in claim 11, and further wherein said actuator means includes a pair of transversely spaced plates detachably mounted on said frame means, a pair of actuators each mounted on one of said plates and fluidly connected to said valve means, said actuators expandible in response to the application thereto of water under pressure; said ratchet wheel means includes a pair of ratchet wheels, each mounted adjacent one of said rear wheels on said rear axle, said rear axle rotatable in response to rotation of said ratchet wheels, and a pair of stop means each operably engaging one of said ratchet wheels for preventing counter rotation thereof; said power arm means includes a shaft rotatably mounted on said plates and extending therebetween, a pair of elongated bars each mounted on one end thereof to one of said actuators and on the other end thereof to said shaft, a pair of links each mounted on one end thereof to said shaft and having a free end and a pair of power arms each pivotally mounted on one end thereof to said free end and drivingly engaged with one of said ratchet wheels, said shaft rotatable in response to expansion of said actuator thus causing said power arm to effect a partial rotation of said ratchet wheels.

13. A traveling irrigation sprinkler apparatus as defined in claim 12, wherein said guide means includes furrow follower means detachably mounted on and extending forwardly of said front axle and operable to guide said frame means, said follower means having a stop valve means mounted thereon and fluidly connected to said valve means, said stop valve means operable in response to engagement with a foreign object for shutting off the flow of water to said valve means.

14. A traveling irrigation sprinkler apparatus for attachment to a conventional farm tractor having a driving axle and a steering axle, the apparatus comprising:

sprinkler means detachably mounted on the tractor and operable in response to the application thereto of water under pressure;

a length of hose, one end of which is detachably connected to said sprinkler means and the other end of which is detachably connected to a source of water under pressure;

hydraulic means detachably mounted on the tractor and operably connected to the driving axle for rotating same, said hydraulic means fluidly connected to said hose and operable in response to the application thereto of water under pressure;

valve means fluidly interposed between said hose and said hydraulic means, and operable in response to the flow of water under pressure therethrough to control the flow of water to said hydraulic means; and guide means detachably mounted on said axle means and operable to guide said frame means.

15. A traveling irrigation sprinkler apparatus as defined in claim 14, and further wherein said hydraulic means includes actuator means mounted on the tractor and operable in response to the application thereto of water under pressure, ratchet wheel means operably connected to the driving axle for rotating same, and rotatable power arm means detachably journaled on the actuator means interconnected between said actuator means and said ratchet wheel means for rotating said ratchet wheel means in response to operation of said actuator means.

16. A traveling irrigation sprinkler apparatus as defined in claim 15, and further wherein said actuator means includes a pair of transversely spaced plates detachably mounted on the tractor, a pair of actuators each mounted on one of said plates and fluidly connected to said hose, said actuators expandible in response to the application thereto of water under pressure; said ratchet wheel means includes a pair of ratchet wheels, each mounted on the driving axle, said axle rotatable in response to rotation of said ratchet wheels; said power arm means includes a shaft rotatable mounted on said plates and extending therebetween, a pair of elongated bars each mounted on one end thereof to said actuators and on the other end thereof to said shaft, a pair of links each mounted on one end thereof to said shaft and having a free end, and a pair of power arms each pivotally mounted on one end thereof to said free end and drivingly engaged with one of said ratchet wheel, said shaft rotatable in response to expansion of said actuators thus causing said power arm to effect a partial rotation of said ratchet wheels.

17. A traveling irrigation sprinkler apparatus as defined in claim 15, and further wherein the tractor has a power take-off connected to the driving axle and operable to rotate same; said actuator means includes a plate detachably mounted on the tractor, a cylinder mounted on said plate and fluidly connected to said hose, a piston reciprocally mounted in said cylinder and responsive to water under pressure, and a piston rod having one end thereof secured to said piston and having the other end thereof extended outwardly from said piston; said power arm means includes a pivotally mounted power arm connected at a free end thereof to said rod, and a pawl pivotally mounted on said power arm and operably engageable with said ratchet wheel means; said piston and piston rod operable to pivot said power arm in response to the flow of the water into and out of said cylinder thus causing said pawl to effect a partial rotation of said ratchet wheel means.

References Cited
UNITED STATES PATENTS

| | | | |
|---|---|---|---|
| 2,883,116 | 4/1959 | Muench | 239—191 |
| 3,085,751 | 4/1963 | Warrick et al. | 239—191 X |

STANLEY H. TOLLBERG, *Primary Examiner.*